United States Patent
Dyer et al.

(10) Patent No.: US 9,674,183 B2
(45) Date of Patent: *Jun. 6, 2017

(54) SYSTEM AND METHOD FOR HARDWARE-BASED TRUST CONTROL MANAGEMENT

(71) Applicant: TRAPEZOID, INC., Miami, FL (US)

(72) Inventors: Michael J. Dyer, Miami, FL (US); José E. Gonzalez, Parkland, FL (US); Albert Caballero, Miami, FL (US)

(73) Assignee: Trapezoid, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,078

(22) Filed: Jan. 7, 2016

(65) Prior Publication Data

US 2016/0119336 A1 Apr. 28, 2016

Related U.S. Application Data

(63) Continuation of application No. 14/142,394, filed on Dec. 27, 2013, now Pat. No. 9,258,331.

(51) Int. Cl.
*H04L 29/06* (2006.01)
*G06F 21/57* (2013.01)

(52) U.S. Cl.
CPC .......... *H04L 63/0853* (2013.01); *G06F 21/57* (2013.01); *H04L 63/0876* (2013.01); *H04L 63/1416* (2013.01); *H04L 63/20* (2013.01)

(58) Field of Classification Search
CPC ............. H04L 63/0853; H04L 63/1416; H04L 63/0876; H04L 63/20; G06F 21/57
See application file for complete search history.

(56) References Cited

U.S. PATENT DOCUMENTS

| 7,941,379 B1 * | 5/2011 | Newstadt | G06Q 20/40 705/50 |
| 8,065,714 B2 * | 11/2011 | Budko | H04L 63/08 713/186 |
| 8,166,552 B2 | 4/2012 | Prafullchandra | |
| 8,336,079 B2 | 12/2012 | Budko | |
| 8,468,591 B2 | 6/2013 | Silverstone | |
| 8,539,589 B2 | 9/2013 | Prafullchandra | |

(Continued)

*Primary Examiner* — Harunur Rashid
*Assistant Examiner* — Cheng-Feng Huang
(74) *Attorney, Agent, or Firm* — Leighton K. Chong

(57) ABSTRACT

A trust control management method for security, operable on a computer system generates a unique Trust ID value by combining user-defined values with hardware-specific values associated with the user's computer system and storing the Trust ID value in a memory register physically associated with the hardware of the computer system. A Trust Control Suite (TCS) operable with a server OS/hypervisor maintains a database of user-defined values and hardware-specific values for computer systems clustered in a trusted computing pool. An attestation procedure is performed by the trust control server combining the user-defined values with the hardware-specific values from its database and comparing it to the user-stored Trust ID value stored in the memory register associated with a user's computer system. Depending on whether it is a match or mismatch, the TCS can determine if it is a trusted computer or not, and can take appropriate alerts and policy actions.

18 Claims, 17 Drawing Sheets

(56) References Cited

U.S. PATENT DOCUMENTS

| | | | | |
|---|---|---|---|---|
| 8,595,483 B2* | 11/2013 | Rozas | ............... | G06F 21/57 |
| | | | | 380/277 |
| 2005/0138393 A1* | 6/2005 | Challener | ........... | G06F 21/6218 |
| | | | | 713/186 |
| 2005/0210467 A1* | 9/2005 | Zimmer | ................ | G06F 21/53 |
| | | | | 718/1 |
| 2009/0287921 A1* | 11/2009 | Zhu | ................ | G06Q 10/02 |
| | | | | 713/155 |
| 2010/0106693 A1 | 4/2010 | O'Donoghue | | |
| 2010/0299313 A1 | 11/2010 | Orsini | | |
| 2010/0306107 A1* | 12/2010 | Nahari | ................ | G06Q 20/02 |
| | | | | 705/44 |
| 2011/0078775 A1* | 3/2011 | Yan | ................ | G06F 21/57 |
| | | | | 726/6 |
| 2011/0178925 A1 | 7/2011 | Lindelsee | | |
| 2012/0124659 A1 | 5/2012 | Craft | | |
| 2012/0151223 A1* | 6/2012 | Conde Marques | . | G06F 21/6218 |
| | | | | 713/193 |
| 2012/0179916 A1* | 7/2012 | Staker | ................ | G06F 21/53 |
| | | | | 713/189 |
| 2012/0254949 A1 | 10/2012 | Mikkonen | | |
| 2013/0047197 A1* | 2/2013 | Saroiu | ................ | G06F 21/6209 |
| | | | | 726/1 |
| 2013/0198797 A1* | 8/2013 | Raghuram | ............ | G06F 21/57 |
| | | | | 726/1 |
| 2013/0347058 A1* | 12/2013 | Smith | ................ | G06F 21/57 |
| | | | | 726/1 |
| 2015/0200934 A1* | 7/2015 | Naguib | ................ | G06F 21/57 |
| | | | | 713/2 |

\* cited by examiner

SYSTEM AND METHOD FOR HARDWARE-BASED TRUST CONTROL MANAGEMENT

This U.S. patent application is a continuation and claims the priority filing benefit of U.S. patent application Ser. No. 14/142,394 filed on Dec. 27, 2013, of the same inventors.

BACKGROUND OF INVENTION

Shared cloud computing technologies are designed to be very agile and flexible, transparently using available resources to process workloads for their customers. However, there are security and privacy concerns with not knowing the integrity, identity and location of the physical devices that make up a cloud platform, and allowing unrestricted workload migration among the servers that comprise an unverified cloud platform and across such unverified cloud platforms. Whenever multiple workloads are present on a multi-server cloud platform, there is a need to segregate those workloads from each other so that they do not interfere with each other, gain access to each other's sensitive data, or otherwise compromise the security or privacy of the workloads. Imagine two rival companies with workloads on the same cloud platform; each company would want to ensure that the servers housing their workloads are trusted to protect their information from the other company as well as any other unauthorized access.

Another concern with shared cloud computing is that workloads could move from servers in a cloud platform located in one country to servers in a cloud platform located in another country. Each country has its own laws for data security, privacy, and other aspects of information technology (IT). Because the requirements of these laws may conflict with an organization's policies or mandates (e.g., laws, regulations), an organization may decide that it needs to restrict which cloud platform it uses based on its specific location. A common desire is to only use cloud platform with servers physically located within the same country as the organization.

Forming trusted computing pools is a leading approach to aggregate trusted systems and segregate them from untrusted resources. This allows for the separation of higher-value, more sensitive workloads from commodity applications and data. The principles of operation are to: (1) Create a cloud platform to meet the specific and varying security requirements of users; (2) Control access to that cloud platform so that only the right applications get deployed there; and (3) Enable audits of the cloud platform so that users can verify compliance.

Such trusted computing pools allow IT to gain the benefits of the dynamic cloud environment while still enforcing higher levels of protections for their more critical workloads. The ultimate goal is to be able to use trusted verification and identification methodologies for deploying and migrating cloud workloads between and among trusted servers within a cloud platform. Current thinking has identified certain prerequisite steps, which can be thought of as staged requirements that a trusted cloud platform solution must meet:

Platform Attestation and Safe Hypervisor Launch:

This stage attempts to ensure that the cloud workloads are run on trusted servers within the cloud platform. The cloud platform includes servers each with a hardware configuration (e.g., BIOS settings) and a hypervisor configuration. The hypervisor operates directly on the hardware, not on top of another operating system, thus it is imperative to show that the hypervisor has not been compromised and that it is the designated version and configuration. Before the server is used for workloads, its trustworthiness must be verified (measured). The items configured in the BIOS and hypervisor need to have their configurations verified before launching the hypervisor to ensure that the assumed level of trust is in place.

Trust-Based Homogeneous Secure Migration:

Once the integrity of the cloud platform is established, the next stage requires that cloud workloads are able to be migrated among homogeneous trusted server platforms within a cloud environment.

Trust-Based and Geolocation-Based Homogeneous Secure Migration:

This stage allows cloud workloads to be migrated among homogeneous trusted server platforms within a cloud environment, taking into consideration geolocation restrictions.

Achieving all three levels of control will not prevent attacks from succeeding, but unauthorized changes to the hypervisor or BIOS can be detected and launch of enforcement actions can be taken. These controls also facilitate compliance with security and governance policies, thus limiting damage to the information being processed or accessed within the cloud computing server.

However, the current approach to forming trusted computing pools by ensuring safe hypervisor launches and monitoring attestation of cloud server platforms has the deficiency that the conventional hypervisor management tools are software-based and run from a platform server virtually connected to remote client computers.

An example of a trust management technology for forming trusted computing pools is provided by Intel® Trusted Execution Technology ("TXT"). TXT implements a foundation for establishing a Transitive Chain of Trust (TCoT) that is rooted in hardware. Each module within the chain has an opportunity to examine and measure the next module, prior to that module's execution. The resulting Integrity Measurements (IM) are stored in shielded locations within a Trusted Platform Module (TPM). By using a secure communication method via the process of Remote Attestation, a third party can later request the IMs as evidence and proof that the BIOS and Operating System meet standards and thus are trusted.

In addition, TXT provides a method for introducing a user-defined value into the chain of evidence by storing that value in a specific secured NVRAM index with the TPM. The current art is to write the identical user-defined value into the TPM NVRAM index of a group of servers to designate a logical grouping or pool. Common terms for this method are "Geotag", "Geolocation" and "Geofence" because historically the first user-defined values used in demonstrating this capability were geographic in nature. In a current implementation of this process, a country code or Geotag is encrypted using a SHA1 function and the resulting Geotag value is stored in the TPM NVRAM index, e.g. SHA1 ("USA"). During the boot process, the Trusted Boot (TBOOT) module that initializes the BIOS uses a "TPM EXTEND" function to Extend the TPM NVRAM index Geotag value into Platform Configuration Register (PCR) 22. To validate the Geotag, the value in PCR22 is compared with an externally maintained lookup table.

However, the value placed into the TPM NVRAM index could be any arbitrary value because the lookup table only validates against the resulting PCR22 value. The validation confirms that PCR22=LookupHash(GeoTag) but does not validate that Extend(PCR22, SHA1(Geotag))==LookupHash(Geotag). The PCR Extend operation is not part of the validation.

There are drawbacks with deploying a homogeneous Geotag value across a number of server platforms within a Geofence. First, the fact that the value can be read by a virtual request to scan the value written in PCR 22 raises the concern that it could be spoofed. In addition, a bad actor could introduce a rogue machine into the Geofence that displays the "expected" PCR 22 Geotag value. A less nefarious but nonetheless important issue is the inability of the common Geotag to tie specific virtual machines to unique physical platform hosts from an evidentiary and forensics perspective. What is needed is a more robust and foolproof way of ensuring that Geotag of a trusted virtual machine cannot be spoofed.

Finally, TXT includes an additional mechanism termed "Launch Control Policy" (LCP), which allows the Platform Supplier (the manufacturer) and the Platform Owner (customer) each to specify requirements for a Secure Operating System Launch. The LCP policies contain specifications of valid Platform Configurations (PCONF policy), Operating System Versions (Measured Launch Environment, or MLE policy) and Authenticated Code Module (ACM) versions (SINIT policy). The LCP values are protected using features of the TPM and are compared against measured PCR and ACM values to determine Platform and Operating System trust. LCP provides a "go/no-go" mechanism for Secure Operating System Launch as well as providing enhanced protection against reset attacks and the ability to restrict access to specific TPM keys, data and resources.

Creating a Launch Control Policy can be a complex process and challenging to maintain. Given that the LCP process is a binary "go/no go" function, it can also be difficult to determine the root cause of LCP failures because the resulting inability to achieve Secure OS Launch is always the same. Moreover, depending on implementation, not all parts of LCP are included as part of the TCoT measurements, therefore it is possible for LCP to change and not impact the TCoT measurements.

SUMMARY OF INVENTION

In accordance with the present invention, a trust control management method for security in cloud computing, operable on a computer system, comprises:

generating a unique encoded alphanumeric value (Trust ID value) by combining a set of alphanumeric values defined by a user of the computer system with a set of other alphanumeric values associated with specific physical hardware embodied with the user's computer system using an encoding algorithm;

storing the Trust ID value associated with the hardware of the user's computer system;

maintaining in a database the user-defined values associated with the user's computer system together with a list of the types of physical hardware-specific values associated with the user's computer system that are to be retrieved the user's computer system and combined with the user-defined values, and the encoding algorithm; and performing an attestation procedure via a trust control application by combining the user-defined values retrieved from the database with the selected physical hardware-specific values retrieved from the user's computer system using the same trust encoding algorithm retrieved from the database that was used to encode the original Trust ID value stored in the hardware of the user's computer system;

comparing the Trust ID value obtained in the attestation procedure with the original Trust ID value stored in the hardware of the user's computer system, and upon a match, determining that the user's computer system is a trusted computer system, or failure to match, determining that the user's computer system is not a trusted computer system, then taking an appropriate security action by the trust control application.

The method of generating and comparing the newly encoded Trust ID value with the original user-stored Trust ID value provides more robust and foolproof verification of the trust status of the user's computer system by encoding both user-defined values and hardware-specific values and storing the originally encoded Trust ID value in the hardware of the user's computer system.

The user-defined data may include a value associated with the geographical location where the user's computer system is to be deployed in order to define its grouping with the trusted computing pool associated with that geolocation.

The hardware-specific values may include values associated with a given version of firmware, BIOS, ROM, or other embedded code (collectively "firmware") present on the hardware.

The creation of the Trust ID value may be carried out without the knowledge of the person storing the Trust ID value on the user's computer hardware as a precaution against security penetration and spoofing.

Other objects, features, and advantages of the present invention will be explained in the following detailed description with reference to the appended drawings.

DETAILED DESCRIPTION OF INVENTION

Figure 1:
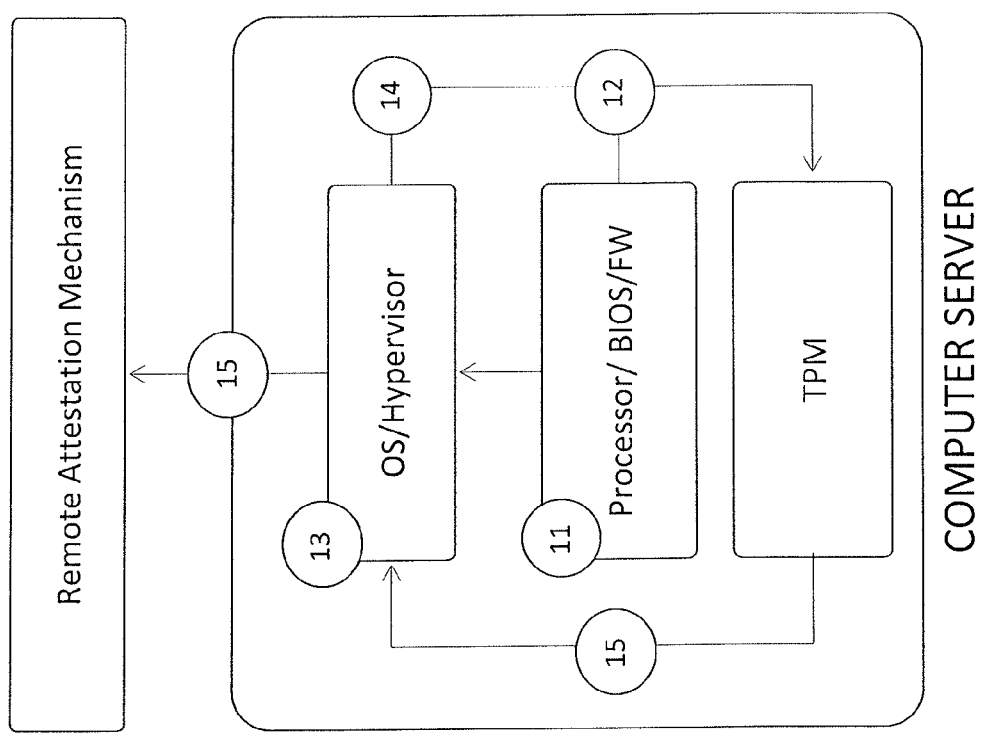
FIG. 1 illustrates a basic process for a TXT launch of a computer system.

In the following detailed description, certain preferred embodiments are described as illustrations of the invention in specific resource applications, communication networks, and/or computer-implemented services or application environments in order to provide a thorough understanding of the present invention. Common methods, procedures, components, or functions for such applications, networks, and/or services or environments which are commonly known to persons of ordinary skill in the field of the invention are not described in detail so as not to unnecessarily obscure a concise description of the present invention. Certain specific embodiments or examples are given for purposes of illustration only, and it will be recognized by one skilled in the art that the present invention may be practiced in other analogous applications or environments and/or with other analogous or equivalent variations of the illustrative embodiments.

The computer-implemented services or application environments in the detailed description which follows may be presented in terms of certain procedures, steps, logic blocks, processing, and other symbolic representations of functional operations implemented on a computer device by a computer program operable on data bits stored within a computer memory. These descriptions and representations are intended to be understood by those skilled in the data processing arts. A program procedure, computer-executed step, logic block, process, etc., is described as a self-consistent sequence of steps or instructions leading to a desired end result, such as providing a tangible computer output, such as an alarm, status indicator, or data display, or implemented by computer to result in physical manipulations of physical quantities or materials. Usually, though not necessarily, such tangible computer-implemented output may take the form of electrical outputs or signals capable of being displayed, stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following descriptions, terms such as "processing" or "computing" or "translating" or "calculating" or "determining" or "displaying" or "recognizing" or the like, refer to the action and processes of a computer system, or analogous electronic computing device, that manipulates and transforms data represented as physical (electronic) quantities within the computer system's registers and memories into other data similarly represented as physical quantities within the computer system memories or registers or other such information storage, transmission or display devices.

A computer or computing resource commonly includes one or more input devices electronically coupled to a processor for executing one or more computer programs for producing an intended computing output. The computer is typically connected as a computing resource and/or communications device on a network with other computer systems. The networked computer systems may be of different types, such as remote PCs, master servers, network servers, and mobile client devices connected via a wired, wireless, or mobile communications network.

The term "Internet" refers to a structure of global networks connecting a universe of users via common or industry-standard protocols. Users having a connection to the Internet commonly use browsers on their computers or client devices to connect to websites maintained on web servers that provide informational content or business processes to users. The Internet can also be connected to other networks using different data handling protocols through a gateway or system interface, such as wireless gateways to connect Internet websites to wireless data networks. Wireless data networks are deployed worldwide and allow users anywhere to connect to the Internet via wireless data devices.

The following definitions are used for certain specific terms applied in this description:

"Attestation": The process of vouching for the accuracy of information. External entities can attest to shielded locations, protected capabilities, and Roots of Trust. A platform can attest to its description of platform characteristics that affect the integrity (trustworthiness) of a platform. Both forms of attestation require reliable evidence of the attesting entity.

"Authenticated Code Module" (ACM): a digitally signed module validated by the processor before execution.

"Attestation Service" (AS): a service procedure for attestation of a trusted launch of a computer platform grouped in a trusted computing pool.

"Basic Input/Output System" (BIOS): a set of computer instructions in firmware that control input and output operations.

"Core Root of Trust for Measurement" (CRTM): The instructions executed by the platform when it acts as the RTM "Dynamic Chain of Trust" (DCoT): A set of Transitive Trust Integrity Measurements that starts on request by the operating system via a special processor instruction.

"GRC": Governance, risk management, and compliance or GRC is the umbrella term covering an organization's approach across the areas of Governance, risk management, and compliance.

"Integrity Measurement" (IM): Values that are the results of measurements on the integrity of the platform. Also referred to as "Trust Measurement"

"ISV": An independent software vendor company specializing in making or selling software, designed for mass or niche markets.

"ISV Product": A product from an independent software vendor.

"OS": An operating system (OS) is a collection of software that manages a computer's hardware resources and provides common services for computer programs.

"Hypervisor": A hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest OS with a virtual operating platform and manages the execution of the guest operating systems. Multiple instances of a variety of OSs may share the virtualized hardware resources.

"Platform Configuration Register" (PCR): A shielded location within a TPM containing a digest of integrity digests.

"Policy Management": The process of enforcing the rules and regulations (policies) of an organization that pertain to information and computing.

"Remote Attestation" means for one system to make reliable statements about the software it is running to another system.

"Root of Trust" (RoT): In a TXT environment, the component (microprocessor) which serves as the trusted component that begins the measurements necessary to establish a chain of trust.

"Root of Trust for Measurement" (RTM): A computing engine capable of making inherently reliable integrity measurements. Typically the normal platform computing engine, controlled by the CRTM. This is the root of the chain of transitive trust.

"SIEM": Security Information and Event Management (SIEM) is a term for software and products services combining security information management (SIM) and security event manager (SEM). SIEM technology provides real-time analysis of security alerts generated by network hardware and applications.

"Static Chain of Trust" (SCoT): A set of Transitive Trust Integrity Measurements that start when the platform powers on.

"Transitive Chain of Trust" (TCoT): The full set of Integrity Measurements, including the Static Chain of Trust and Dynamic Chain of Trust.

"Transitive Trust": Also known as "Inductive Trust", in this process the Root of Trust gives a trustworthy description of a second group of functions. Based on this description, an interested entity can determine the trust it is to place in this second group of functions. If the interested entity determines that the trust level of the second group of functions is acceptable, the trust boundary is extended from the Root of Trust to include the second group of functions. In this case, the process can be iterated. The second group of functions can give a trustworthy description of the third group of functions, etc. Transitive trust is used to provide a trustworthy description of platform characteristics, and also to prove that non-migratable keys are non-migratable.

"Trust Aware Proxy": A proxy server is a server (a computer system or an application) that acts as an intermediary for requests from clients devices seeking resources from other servers. A Trust Aware Proxy is a proxy server that is aware of the integrity and identity of the computer systems to which the Trust Aware Server is connecting.

"Trust Aware App": A software application that is aware of the integrity and identity of the computer system that is running the specific application.

"Trust Control Suite" (TCS): a suite of trust control management tools to establish a measured, trusted environment within a trusted computing pool, and to carry out policies to protect the security of the trusted computing pool.

"Trusted Execution Technology" (TXT): is the name of a computer hardware technology whose primary goals are (a) Attestation—attest to the authenticity of a platform and its operating system (OS); (b) assure that an authentic OS starts in a trusted environment and thus can be considered a trusted OS; (c) provide the trusted OS with additional security capabilities not available to an unproven OS.

"Trusted Platform Module" (TPM): A hardware device implementing the functions defined in the TCG Trusted Platform Module Specification "User": an individual user, business entity, public sector agency, and/or service provider to such entity or agency using a specific computer system.

In a preferred embodiment in accordance with the present invention, the trust control management system and method provides a processor-based, tamper-resistant environment that compares user-defined values and hardware-specific values, such as firmware, BIOS, and/or operating system values, to compute a Trust ID value and compare it to a previously computed and stored ("known good") Trust ID value to establish a that a computer system is operating in a measured, trusted state within a trusted computing pool. If integrity and trust are not verified, the trust control management suite identifies that the system is not behaving as expected, and follows the proper embedded policy or policies to protect the computer system and/or the trusted computing pool to remediate the problem.

FIG. 1 illustrates a basic process for a TXT launch of a computer system. At platform power-on, processor microcode 11 starts a chain of measurements 12 and security checks, which include the BIOS, BIOS Authenticated Code Module ("ACM"), Option ROMs, Master Boot Record and OS Loader. This chain of measurements 12 is referred to as the Static Chain of Trust (SCoT). Following Trusted Computing Group (TCG) specifications, the SCoT measurements are stored within the Trusted Platform Module (TPM). The Dynamic Chain of Trust (DCoT) then begins with a special processor instruction that looks at the OS/Hypervisor 13 and starts a chain measurements 14 and security checks of the SINIT ACM and key operating system (OS) components. The LCP Engine is invoked by the SINIT ACM to validate the operating system components against any policy defined by the Platform Supplier or the Platform Owner. The DCoT measurements are stored within the Trusted Platform Module (TPM). A Remote Attestation Mechanism is used to securely expose the measurements 15 of the full Transitive Chain of Trust (TCoT) that are stored in the TPM to outside entities.

Because the TXT launch can evaluate and report on platform integrity using attestation mechanisms, it can provide valuable insights and controls when used in the context of cloud computing platforms. This allows other key software—hypervisor, cloud orchestration and management, and security policy applications—to understand and use platform integrity attributes to control workloads and data and better address security risks by keeping sensitive or regulated workloads separate from platforms with unknown integrity status.

In order to have attestation of a trusted launch of a computer platform grouped in a trusted computing pool, two key questions that an inquiring entity should have answered are:

1. How would the entity needing this attestation information know if a specific computer platform has performed a secure launch?

2. Why should the entity requesting the attestation information believe the response from the attested computer platform?

Figure 2:
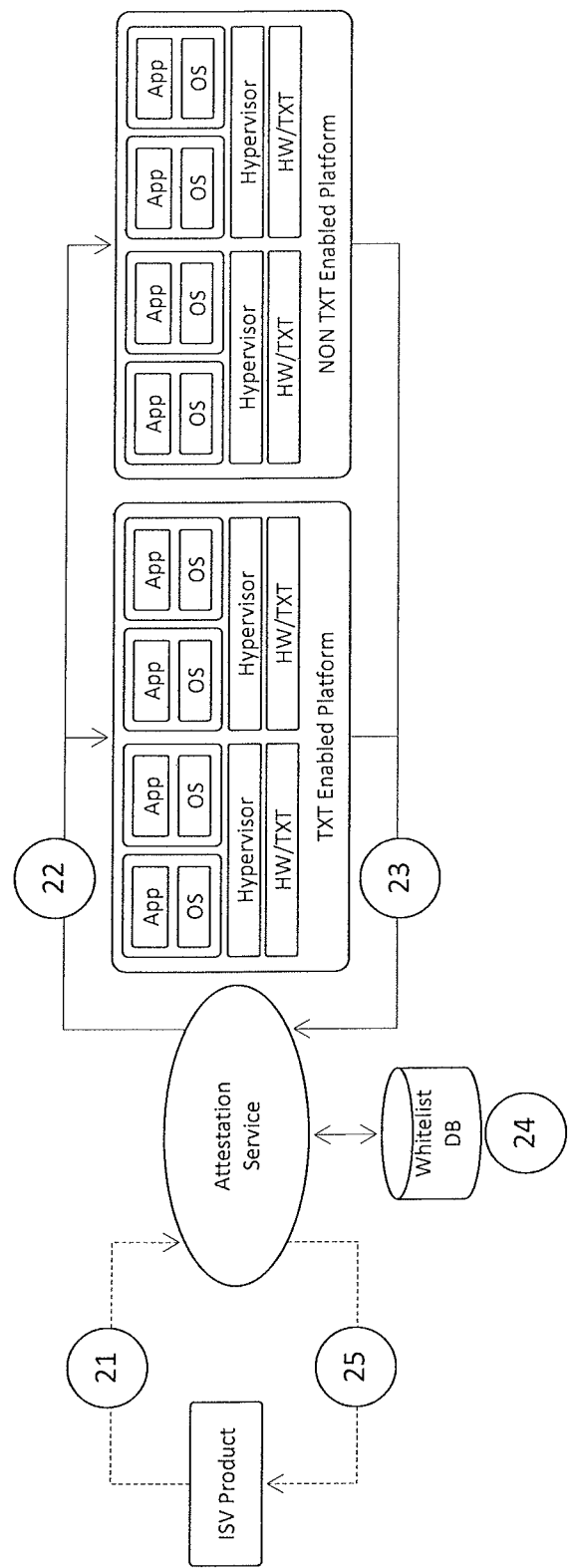
FIG. 2 illustrates an example of attestation of a trusted launch of a computer platform grouped in a trusted computing pool.

FIG. 2 illustrates an example of attestation of a trusted launch of TXT-enabled platforms and possible non-TXT-enabled platforms grouped in a trusted computing pool. An ISV Product needing to know whether it is addressing a trusted computing pool sends a Platform Trust Status request 21 to an Attestation Service (AS), which accesses a Remote Attestation Mechanism (in FIG. 1) for computers grouped in the trusted computing pool. The AS sends a request 22 for Integrity Measurements (IM) to the computer platforms. Each platform must send a reply 23 with its IM values. The AS validates the IM against a Whitelist Database (DB) 24 of known-good values, and provides the definitive answers 25 to the above two key security questions to the ISV Product server. The AS will require Roots of Trust implementation of a hardware-based trust-enabled OS or Hypervisor. Each polled platform has to have a Root of Trust Measurement (RTM) that is implicitly trusted to provide an accurate measurement, which TXT provides. The platform also has to have a Root of Trust for Reporting (RTR) and a Root of Trust for Storage (RTS), which the Trusted Platform Module (TPM) provides.

Attestation is the process of providing a digital signature of a set of platform configuration registers (PCRs)—a set of registers in a TPM that are extended with specific measurements for various launch modules of the software—and having the requestor validate the signature and the PCR contents. The entity wishing to validate the values in the TPM requests these using the TPM_Quote command. This command specifies an Attestation Identity Key to perform a digital signature of the quote, and a NONCE to ensure freshness of the digital signature. The entity that challenged this information from the TPM can now make a determination about the trust of the platform by comparing the measurements contained in the TPM quote with "known good" or "golden" measurements.

Figure 3:
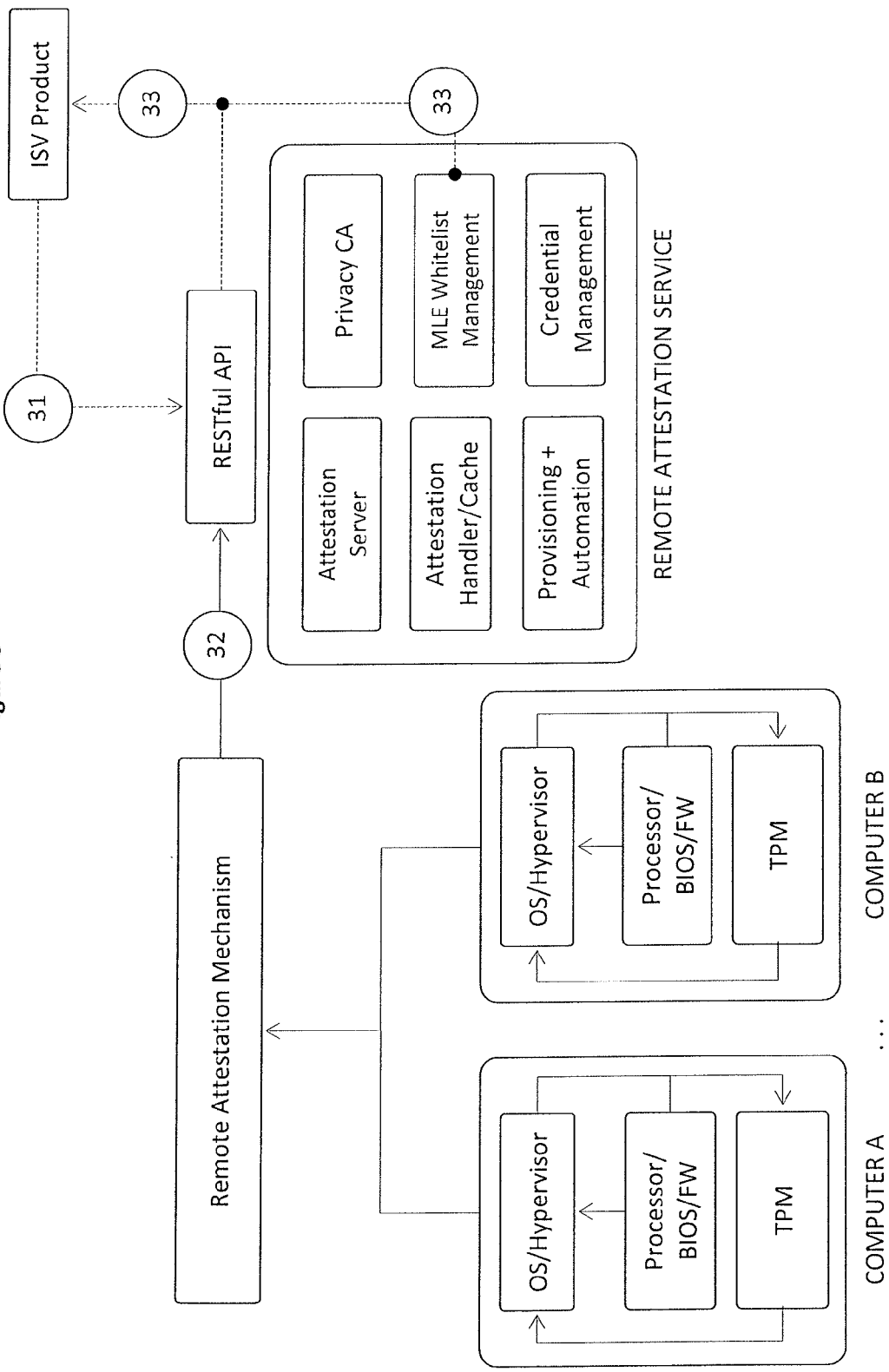
FIG. 3 illustrates a current model for attestation and whitelist management following the Attestation Service (AS) architecture.

FIG. 3 illustrates a current model for attestation and whitelist management following a suggested Attestation Service (AS) architecture. The Whitelist Setup Process proceeds as follows: establish baseline reference values; create a Whitelist; import the Whitelist into the AS; the AS stores whitelist values in a database. For an attestation request, an ISV Product software sends a request 31 for the platform trust status from the Attestation Service (AS). In step 32, the AS requests the Integrity Measurements (IM) from each computer platform via Remote Attestation, and the platform responds with the integrity measurements. In step 33, the AS validates the integrity measurements against its Whitelist of known-good values. In step 34, the AS attests to the trustworthiness of the platforms in the trusted computing pool to the ISV Product server.

The disadvantages of the software-only Whitelist are that the whitelist values are ONLY recorded in software and are potentially subject to invalid updates, corruption or alteration; it employs multiple Attestation Service components; the OS/Hypervisor or Hypervisor Manager are intermediaries between the TPM and the AS; and successful attestation may not match actual intended values for a specific device. Managing the "known good" values for different hypervisors, operating systems, and BIOS software versions, and ensuring they are protected from tampering and spoofing, is a critical IT operations challenge. This capability can be internal to a company, managed by a service provider, or delivered remotely as a service by a trusted third party.

Figure 4:
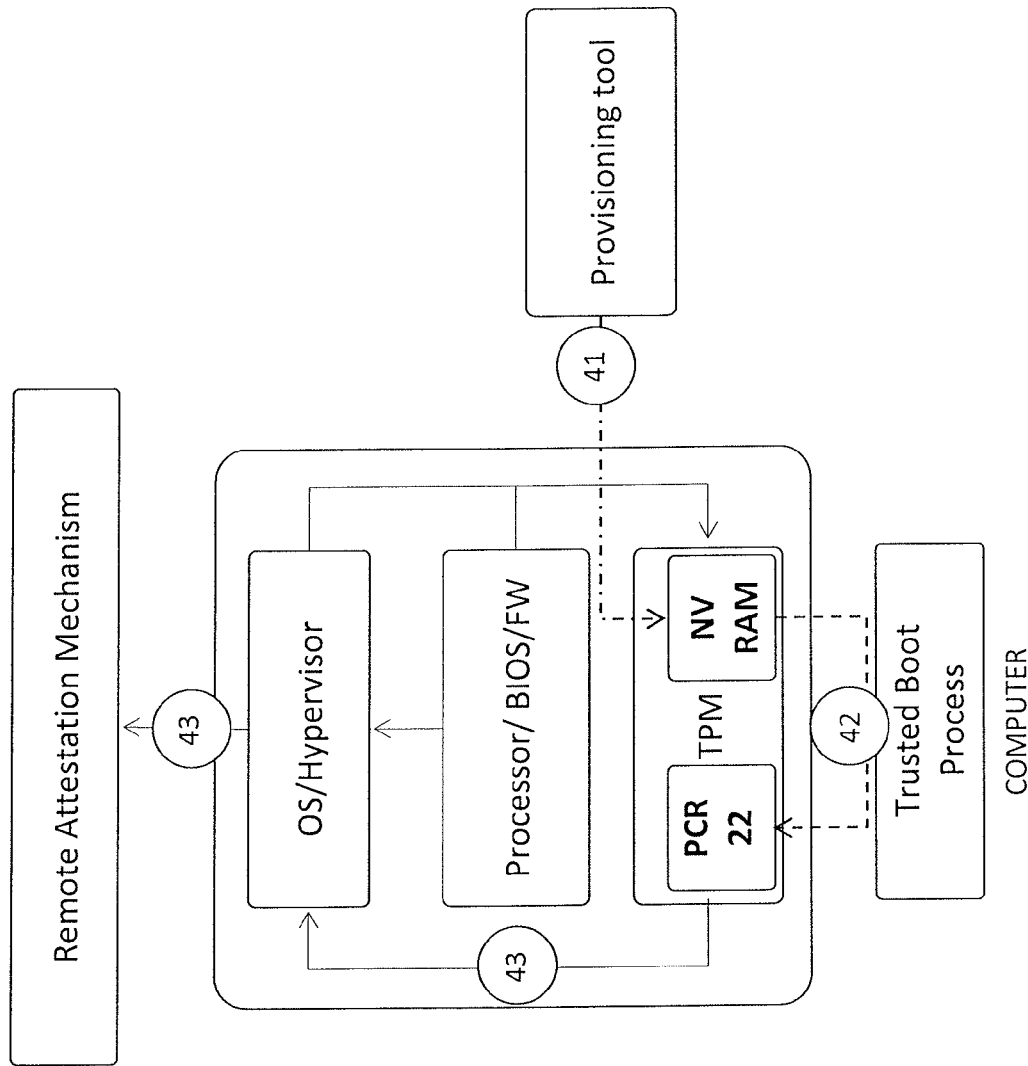
FIG. 4 illustrates a provisioning tool for extending a user defined value to a server TPM chip.

FIG. 4 illustrates the basic methodology of how TXT utilizes a user-defined value stored to a non-volatile RAM (NVRAM) index in the TPM installed in a TXT enabled computer (see FIG. 1). A provisioning tool 41 writes the value to NVRAM, which is later encoded into Platform Configuration Register (PCR) 22 of the TPM using the TMP_EXTEND function 42 during the trusted boot process. A Remote Attestation Mechanism is used to securely expose the PCR 22 value to outside entities. The prior art only illustrates how a user may assign a homogeneous value, referred to as "geolocation" in the prior art, across a group of servers during the provisioning process. In the present invention, a unique, device-specific Trust ID value is encoded by combining user-defined values and hardware-specific values associated with the user's computer system (see FIG. 12). In step 43, the value in PCR 22 is provided via a Remote Attestation Mechanism to an external Attestation Service.

Figure 5:
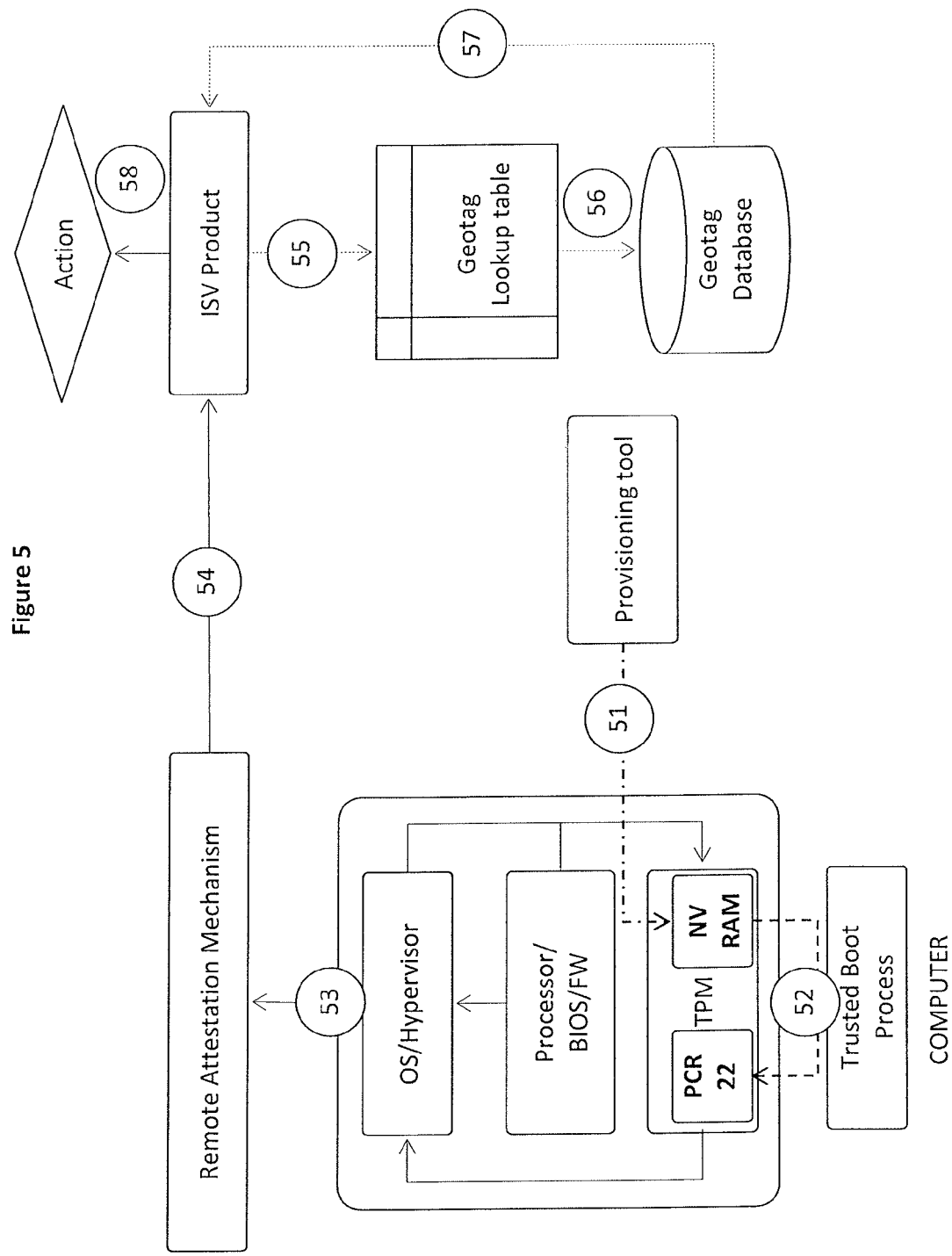
FIG. 5 illustrates a sample geotag use case.

FIG. 5 illustrates a sample Geotag use case representing the current usage of PCR 22. The provisioning tool 51 writes a geotag hash value to NVRAM. During the trusted boot process 52, the geotag hash value is extended into PCR 22 and in step 53 is provided to outside entities via a Remote Attestation Mechanism to securely expose the results of the EXTENDED geotag hash value in PCR 22. In step 54, an ISV Product obtains the PCR 22 value via a Remote Attestation Mechanism, and in step 55 performs a look-up of the PCR 22 geotag hash value and finds it on a Geotag Lookup Table. In step 56, the values on the Geotag Lookup Table are searched for corresponding values in the Geotag Database. In step 57, the Geotag Database provides a user-readable/presentable string/description to the ISV Product. The ISV Product can then take a predetermined action 58 based on a matched or mismatched Geotag value.

Figure 6:
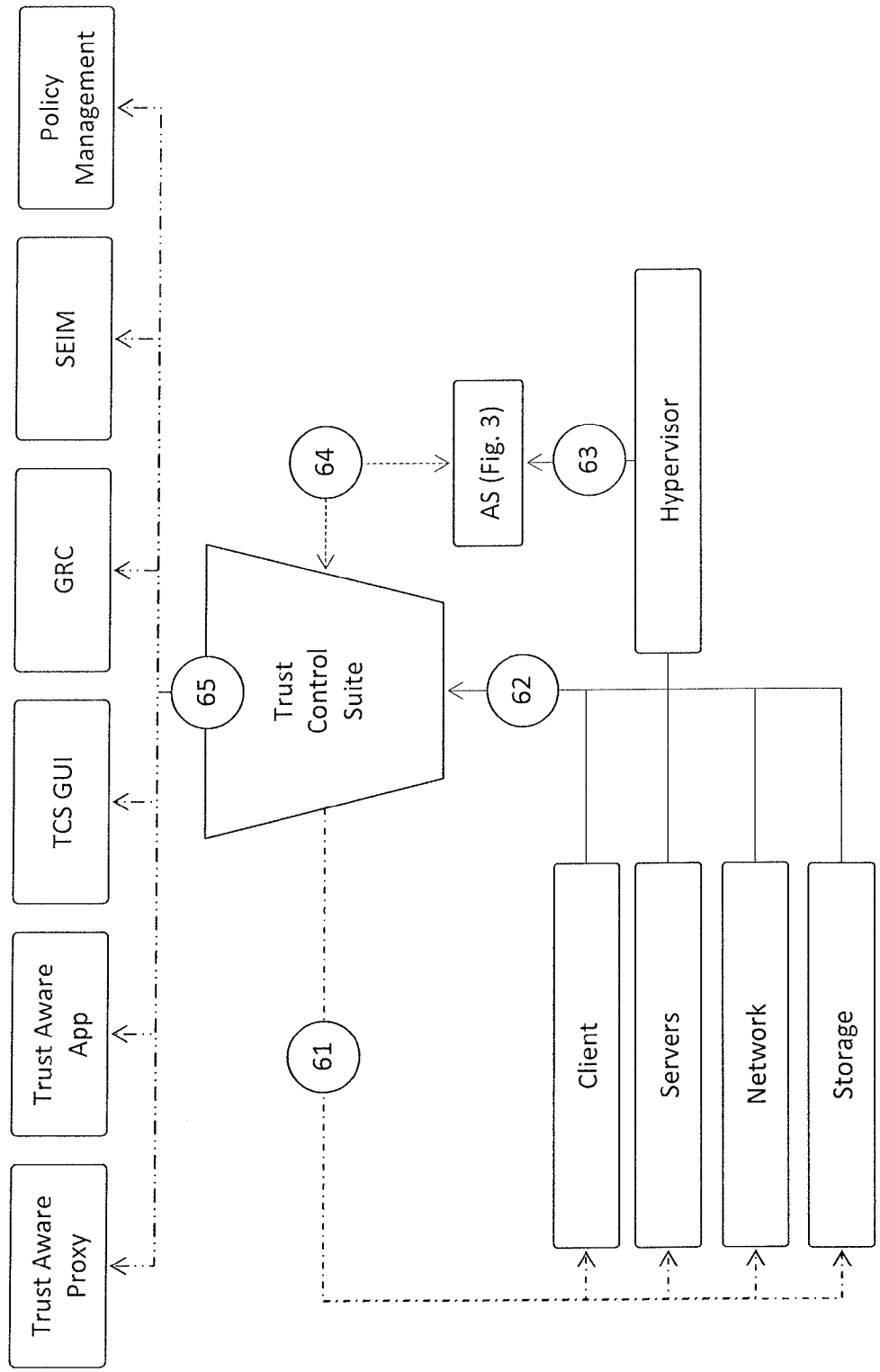
FIG. 6 illustrates a Trust Control Suite (TCS) that combines the functions of attestation and geotagging in a preferred embodiment of the present invention.

FIG. 6 illustrates a Trust Control Suite (TCS) in a preferred embodiment of the present invention that combines the functions Attestation, Geotaging and Launch Control Policy in the Trust ID that is the subject of this invention. It further introduces the ability to use the same unique identifier for policy and compliance management, all based on values stored in the subject device's hardware. TCS has the following five basic operations. In step 61, it generates and stores a unique Trust ID value on each device of the trusted computing pool (see FIG. 10). In step 62, the TCS obtains the Trust ID values associated with the devices. In step 63, if requested by an optional Attestation Service (AS), a Hypervisor reports the Trust-ID measurements to the AS, which communicates them to the TCS in step 64. In step 65, the TCS performs the following: (a) monitors integrity and identity of devices using information obtained from the devices, including Trust Measurements, Trust IDs and other hardware specific values; (b) generates TCS Alerts on changes in integrity and identity of devices and communicates them to TCS Subscribers, which may include one or more of Trust-Aware Proxy, Trust-Aware App, TCS GUI, GRC, SEIM, and Policy Management; (c) generates TCS Events and communicates them to TCS Subscribers; and (d) orchestrates coordinated responses by TCS Subscribers, which can take action based on TCS Alerts and Events.

Figure 7:
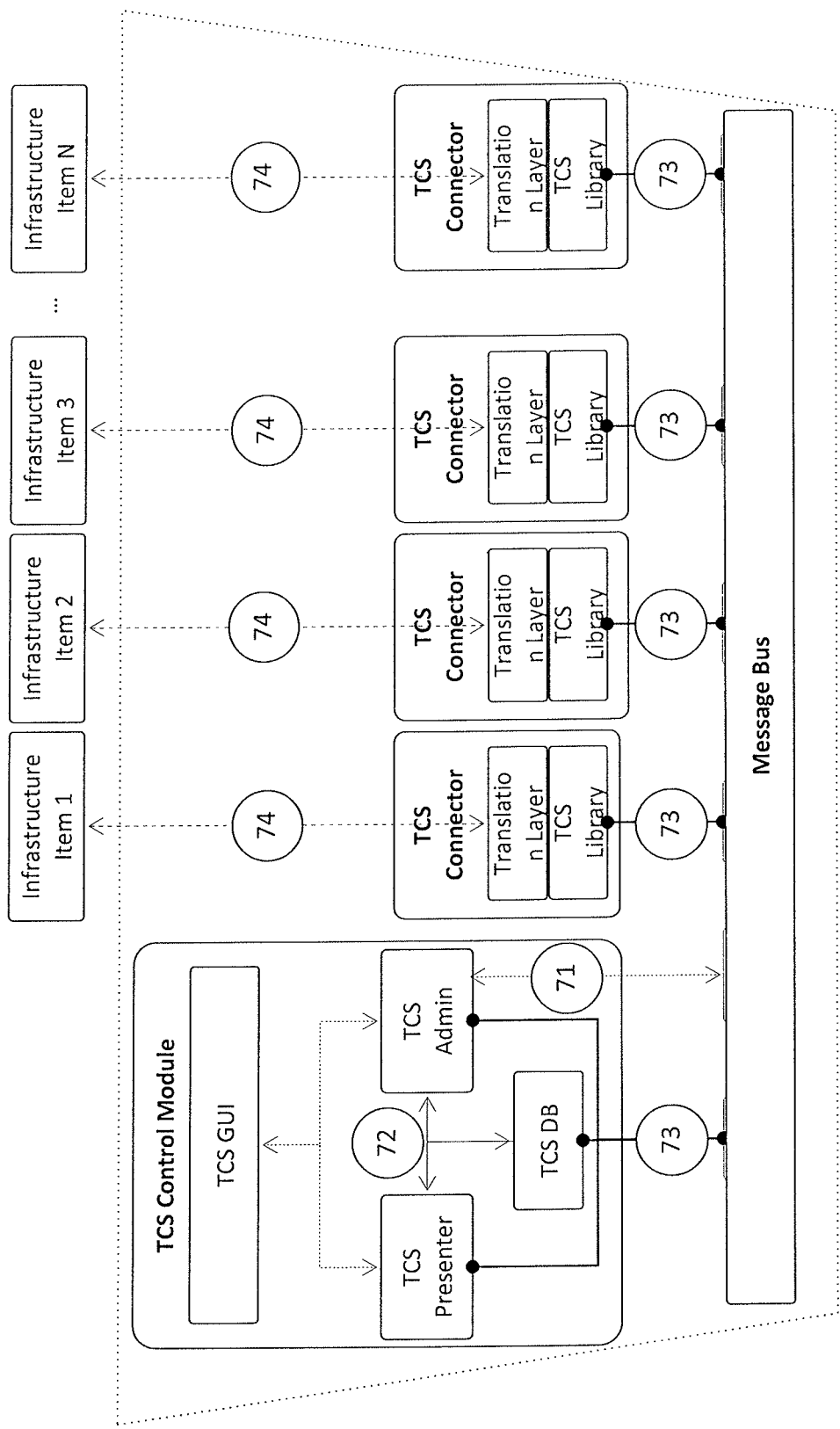
FIG. 7 illustrates the preferred TCS modular architecture.

FIG. 7 illustrates the preferred TCS modular architecture. The modular architecture includes a loosely coupled set of TCS Connectors that communicate with specific devices (either hardware or software) in a user's information infrastructure via industry standard protocols, including REST connection 71, ASYNC connection 72, and AMQP connection 73 from an associated database or library to a message bus. A TCS Connector transmits through TCS connection 74 to an interface of a respective computing infrastructure Item 1, 2, etc., TCS Alerts and Events from the TCS to the subscribing device (TCS Subscriber) in a manner that is intelligible to the specific TCS Subscriber. A TCS Connector may also transmit alerts and events from a TCS Subscriber to the TCS Control Module so that these may be processed into TCS Alerts and Events for other TCS Subscribers.

Figure 8:
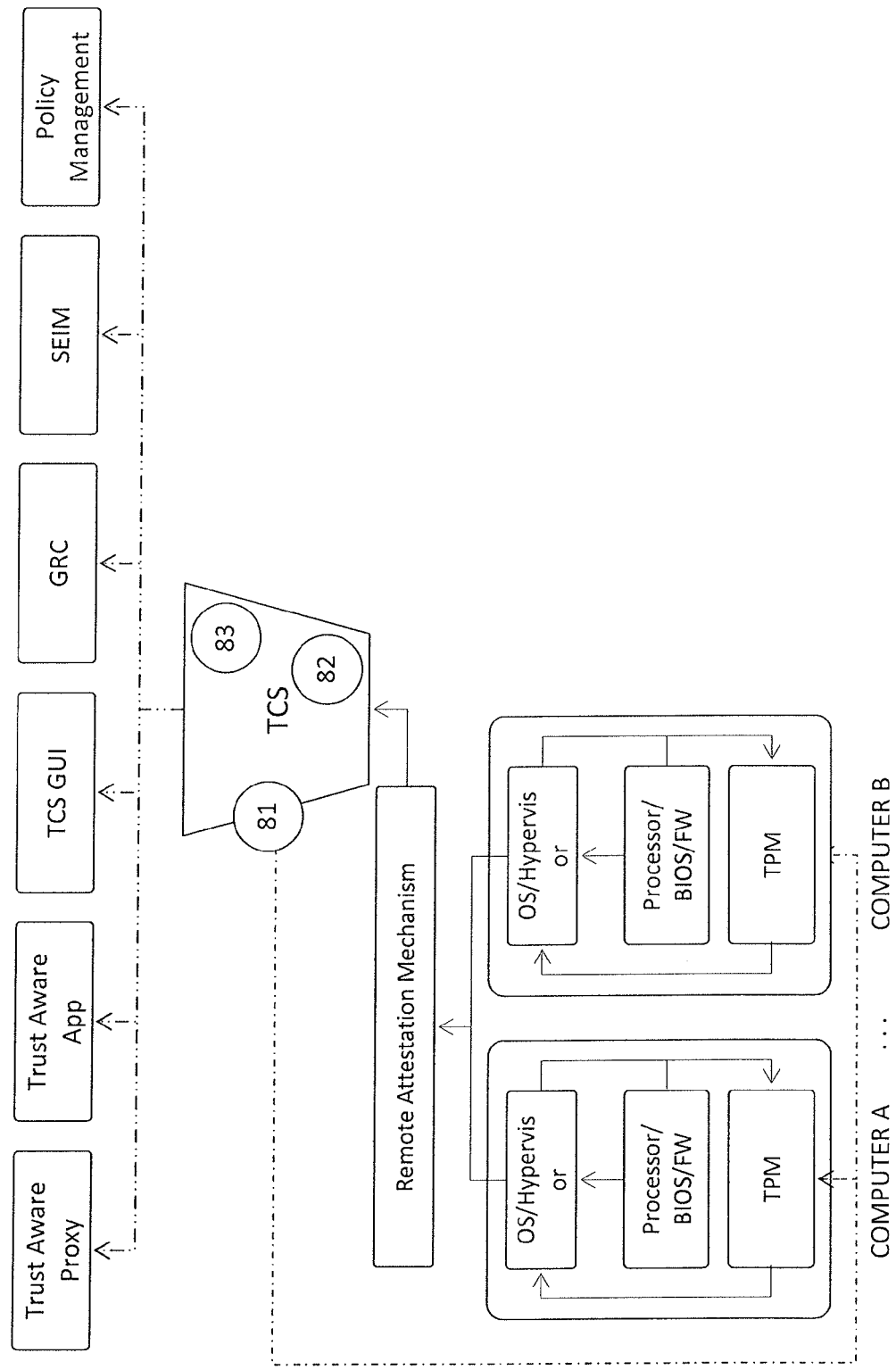
FIG. 8 illustrates the Trust ID creation and validation process.

FIG. 8 illustrates a preferred embodiment of the creation and validation process of a unique Trust ID that is the subject of this invention. A fundamental feature of the invention method described herein is the use of the Trust ID as a trust measurement that complements the SCoT and DCoT Measurements. In the preferred embodiment, a Trust ID Configuration Tool (TConfig) of the TCS generates in step 81 a unique Trust ID for each device using a combination of hardware-specific values obtained from the subject device and user-specific values stored in a device database (Seed Values). The TConfig uses an algorithm that: (i) performs a HASH function against the Seed Values to create cryptographic Hash values; (ii) arranges the resulting Hash values in a specific sequence (saving the specific sequence order for future retrieval by TConfig); and (iii) performs an Extend operation against each Hash value in the specific Sequence. The final Extended Value can now be stored on the device as the unique Trust ID, preferably in a cryptographically protected space such as an index in NVRAM on the hardware TPM. Depending on the implementation, the Trust ID could be further extended from NVRAM into a PCR on the TPM. In step 82, the TCS in response to an attestation request through the Remote Attestation Mechanism recalculates and verifies the Trust-ID value as compared to the stored value, and in step 83 orchestrates alerts and events as appropriate (see FIG. 7).

Figure 9:
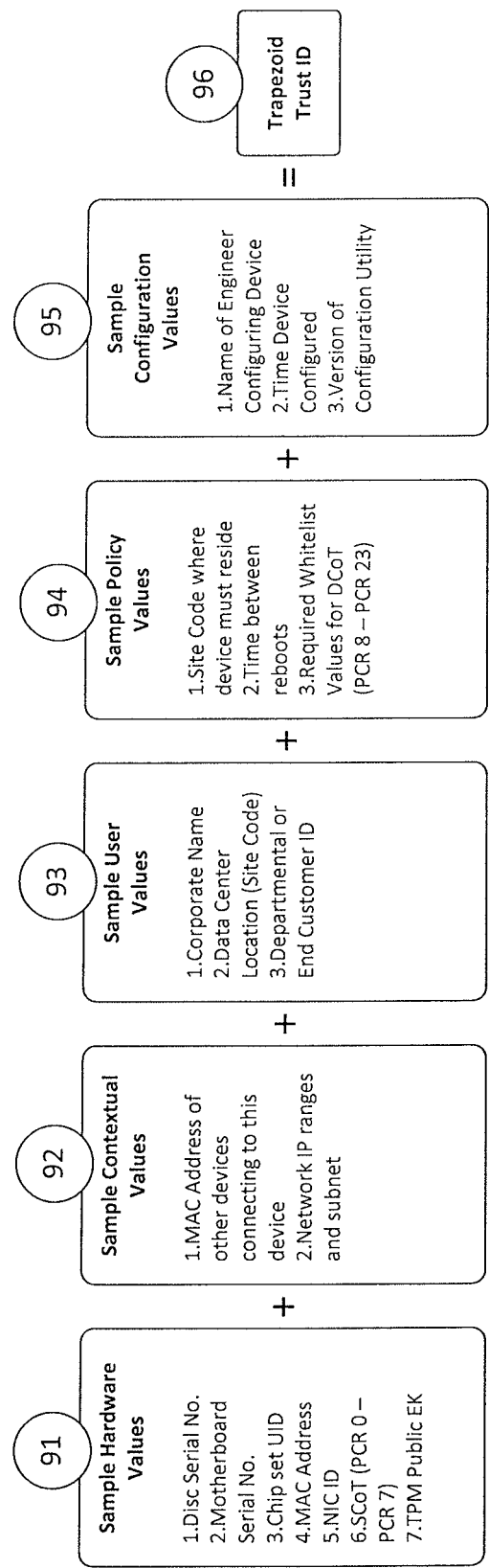
FIG. 9 illustrates sample Seed Values used to encode a Trust ID.

FIG. 9 illustrates sample Seed Values used to encode a Trust ID. In the preferred implementation, as part of setting up TConfig, a User chooses the categories of Device-specific Seed Values 91, Contextual Values 92, User-specific Seed Values 93, and Policy Values 94 and Configuration Values 95 that TConfig will use to generate the Trust ID 96

Figure 10:
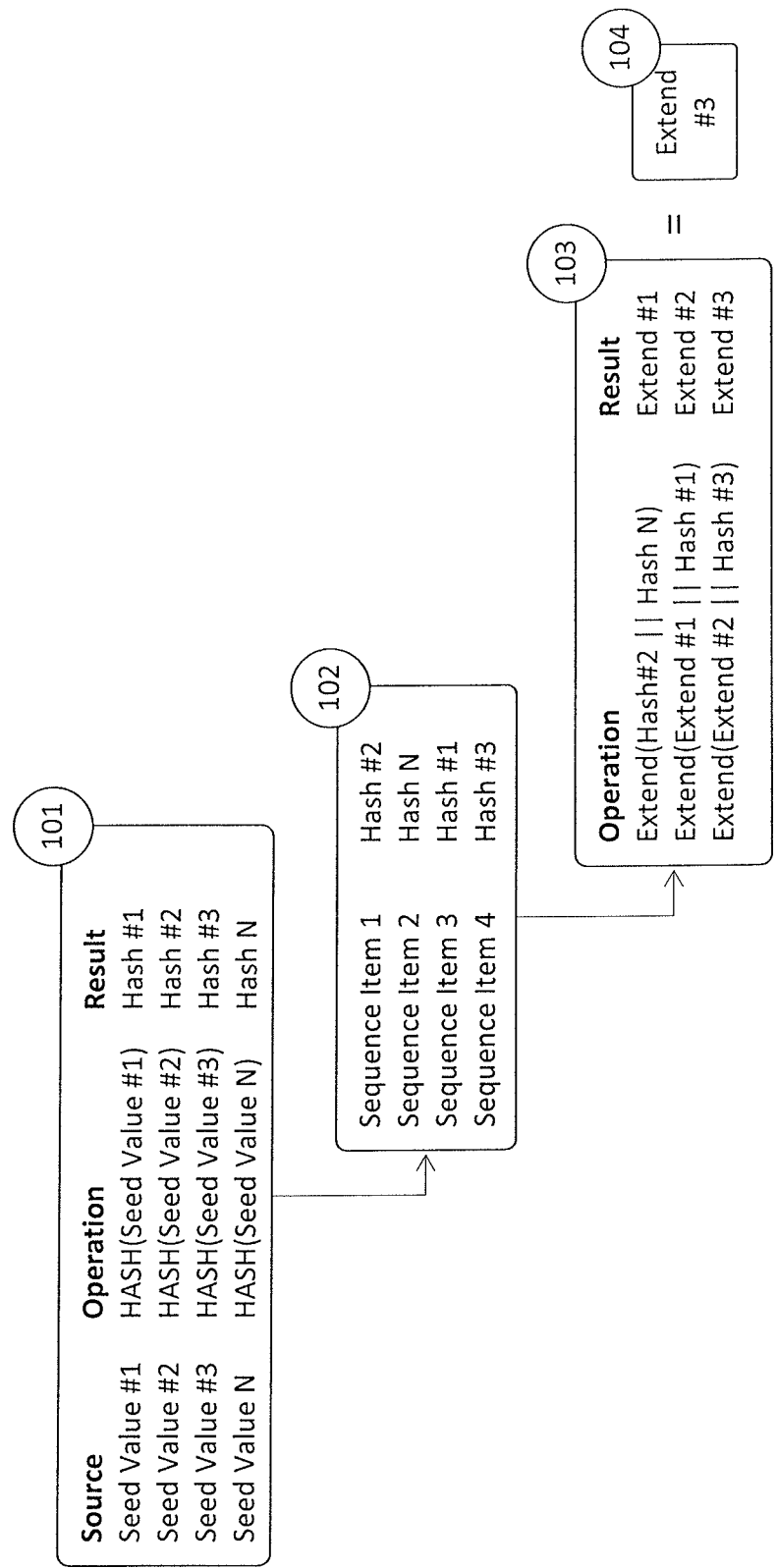
FIG. 10 illustrates a sample algorithm for generating a Trust ID value.

FIG. 10 illustrates a sample algorithm for generating a Trust ID value. The preferred algorithm generates a corresponding hash for each Seed Value in step 101, determines a sequencing of the hash values in step 102, performs an "Extend" operation encoding the hash values in step 103, and the resulting value in step 104 is the Trust ID value ultimately to be written to the desired location, for example TPM.

Figure 11:
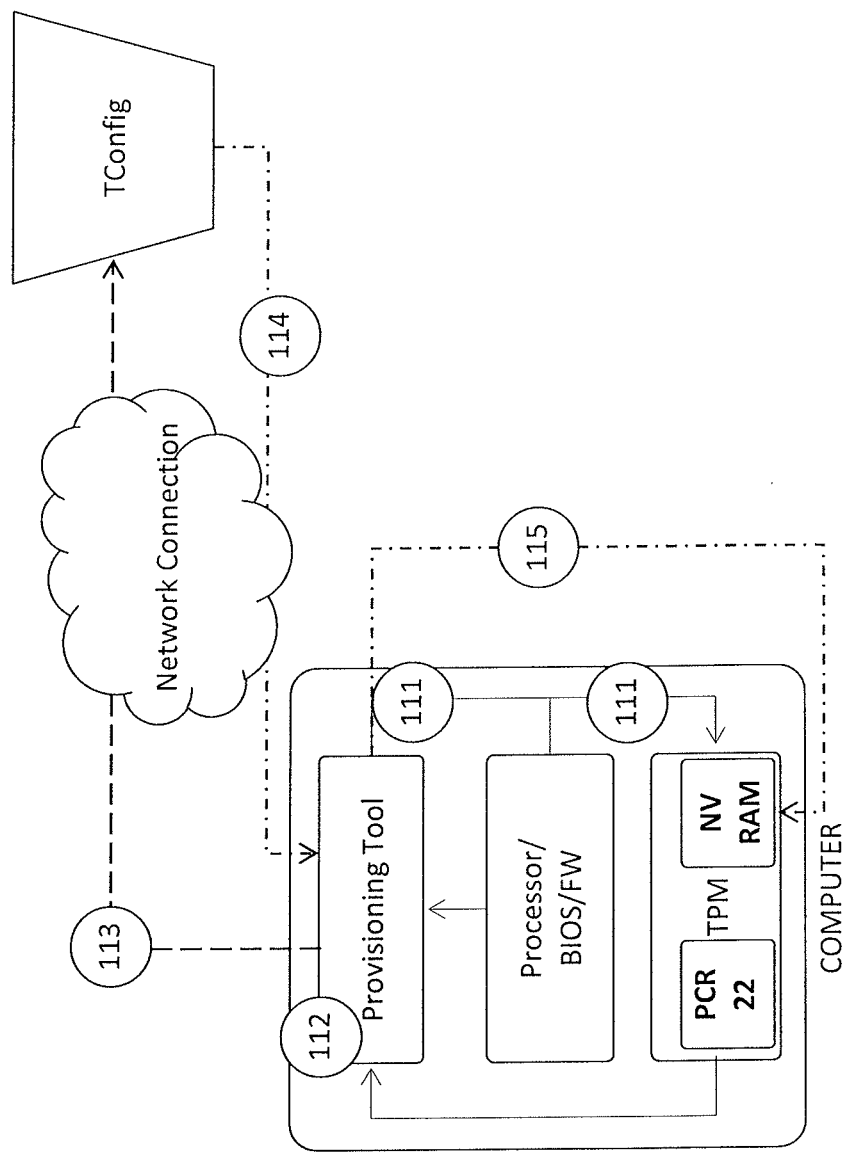
FIG. 11 illustrates sample Trust ID creation and provisioning process.

FIG. 11 illustrates a sample Trust ID creation and provisioning process. The system boots using a local Provisioning Tool to measure the SCoT and DCoT values in step 111, obtains local Seed Values from the device in step 112. The list that the local Provisioning Tool provides includes, inter alia, the actual Device-specific Seed Values for such types of Seed Values initially chosen by the User. The Provisioning Tool sends all these results to the TConfig, in this case configured as a module of TCS, and requests a Trust ID in step 113. The TCS via TConfig remotely creates the unique, device-specific Trust ID and sends it in step 114 to the requesting Provisioning Tool, which stores the Trust ID value in NVRAM in step 115. To calculate the Trust ID, TConfig obtains the previously stored Seed Value Configuration from the Database, determines a Sequence, calculates the unique hardware- and user-specific Trust ID, returns the Trust ID to the local Provisioning Tool, and associates the Sequence to the Seed Values Configuration in the Database. Upon receiving the Trust ID, the Provision Tool stores the Trust ID on the subject device as part of the standard process for provisioning such a device for use.

Figure 12:
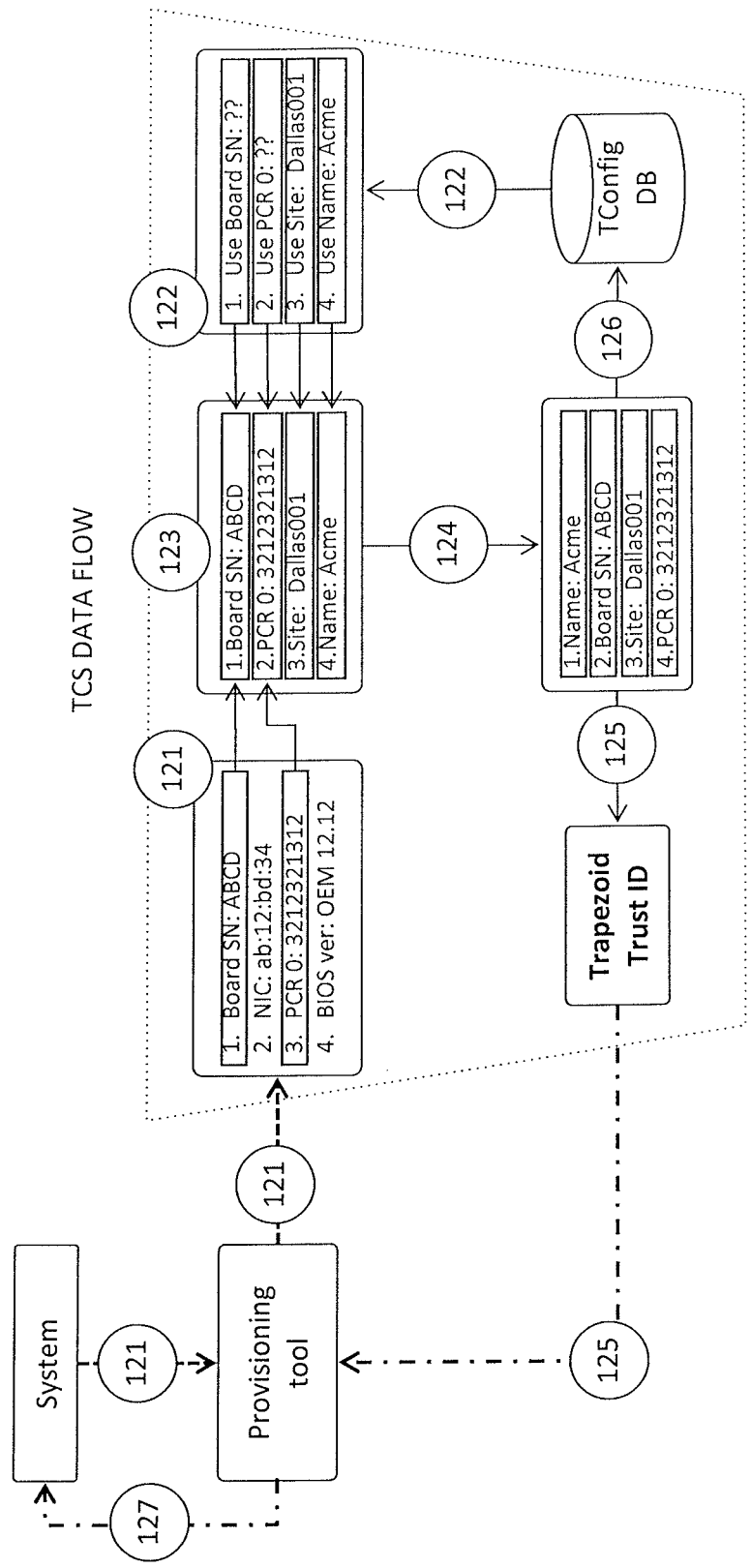
FIG. 12 illustrates a sample of creating a Trust ID from Seed Values.

FIG. 12 illustrates a sample of the data flow for creating a Trust ID from Seed Values. The system boots using a local Provisioning Tool and obtains and transmits a full list of device values in step 121, which are not previously known to the User or TConfig. TConfig obtains the pre-existing User configuration of required seed values in step 122, which is not previously known to Provisioning Tool or TConfig. TConfig assembles the list of required seed values in step 123, chooses a sequence for encoding them in step 124 (not known to the User or Provisioning Tool), calculates the Trust ID in step 125 and delivers the Trust ID to the Provisioning Tool. TConfig associates the chosen sequence with the User configuration, but stores it separately in a TConfig Database (DB) in step 126. The Provisioning Tool stores the Trust ID in step 127.

Figure 13:
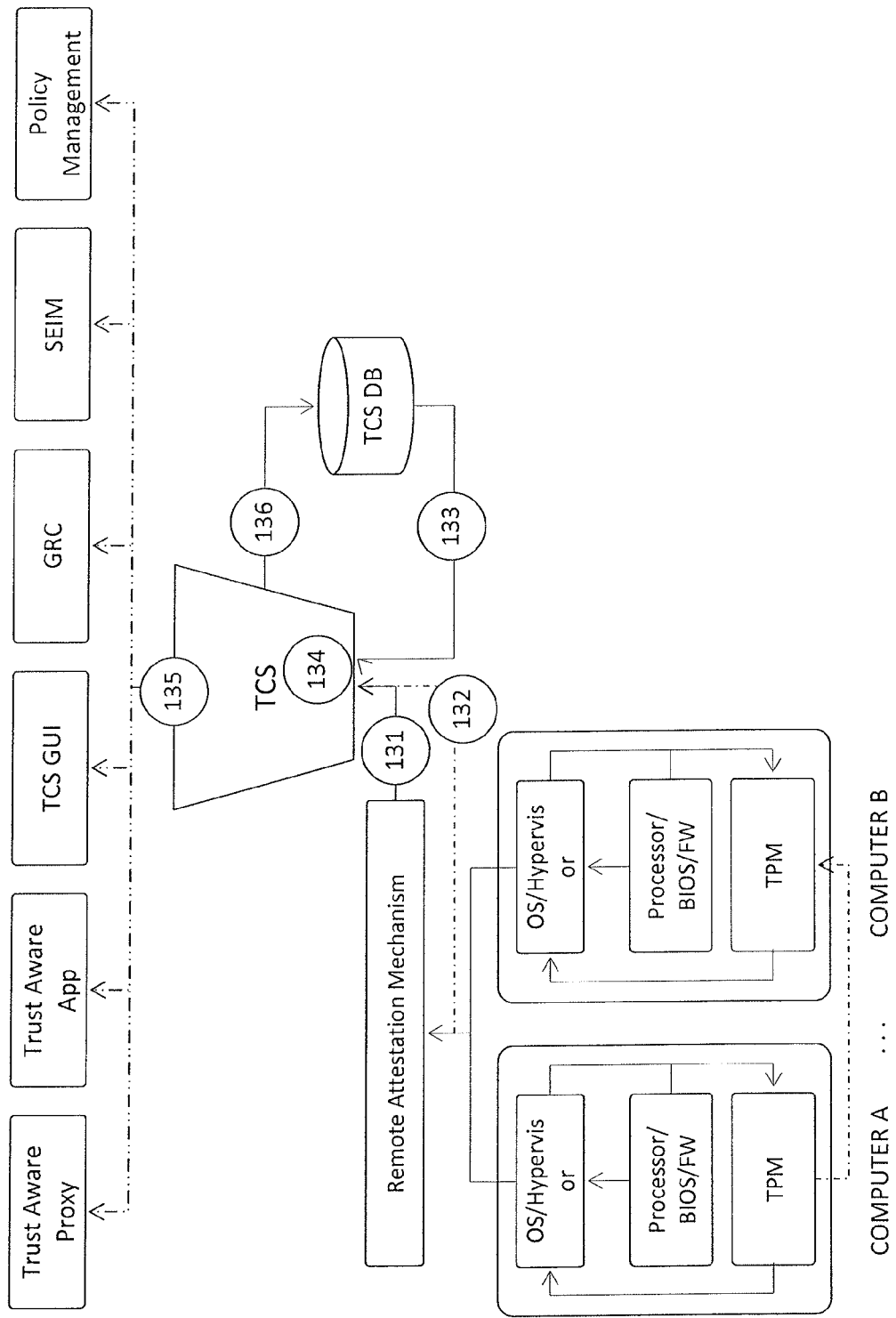
FIG. 13 illustrates a sample of verifying a Trust ID.

FIG. 13 illustrates a sample how to recalculate and verify a Trust ID. In this embodiment, TCS obtains SCoT and DCoT Measurements, Trust ID, and local Seed Values from the specific device in step 131 in response to a request, a random event or predetermined schedule as part of the normal process described with respect to FIG. 6, and the Remote Attestation Mechanism reports the TCoT values to the TCS, including Trust ID, Seed Values (see FIG. 8). At that time, TConfig recalculates the Trust ID using the currently reported hardware-specific Seed Values, together with the user-specific values and the Sequence stored in the Database The OS or Hypervisor reports other local Seed Values to the TCS in step 132. The TCS DB provides User defined formula and remote Seed Values in step 133. In step 134, TCS calculates fresh Trust ID based on the User defined formula for the reporting device, using Extend Function if necessary, and compares Expected Trust ID with the Reported Trust ID from the reporting device (see FIG. 14). In step 135, based on whether or not there is a match, TCS Alerts Subscribers to the results according to the chosen policies. In step 136, TCS logs the results for audit reporting.

Figure 14:
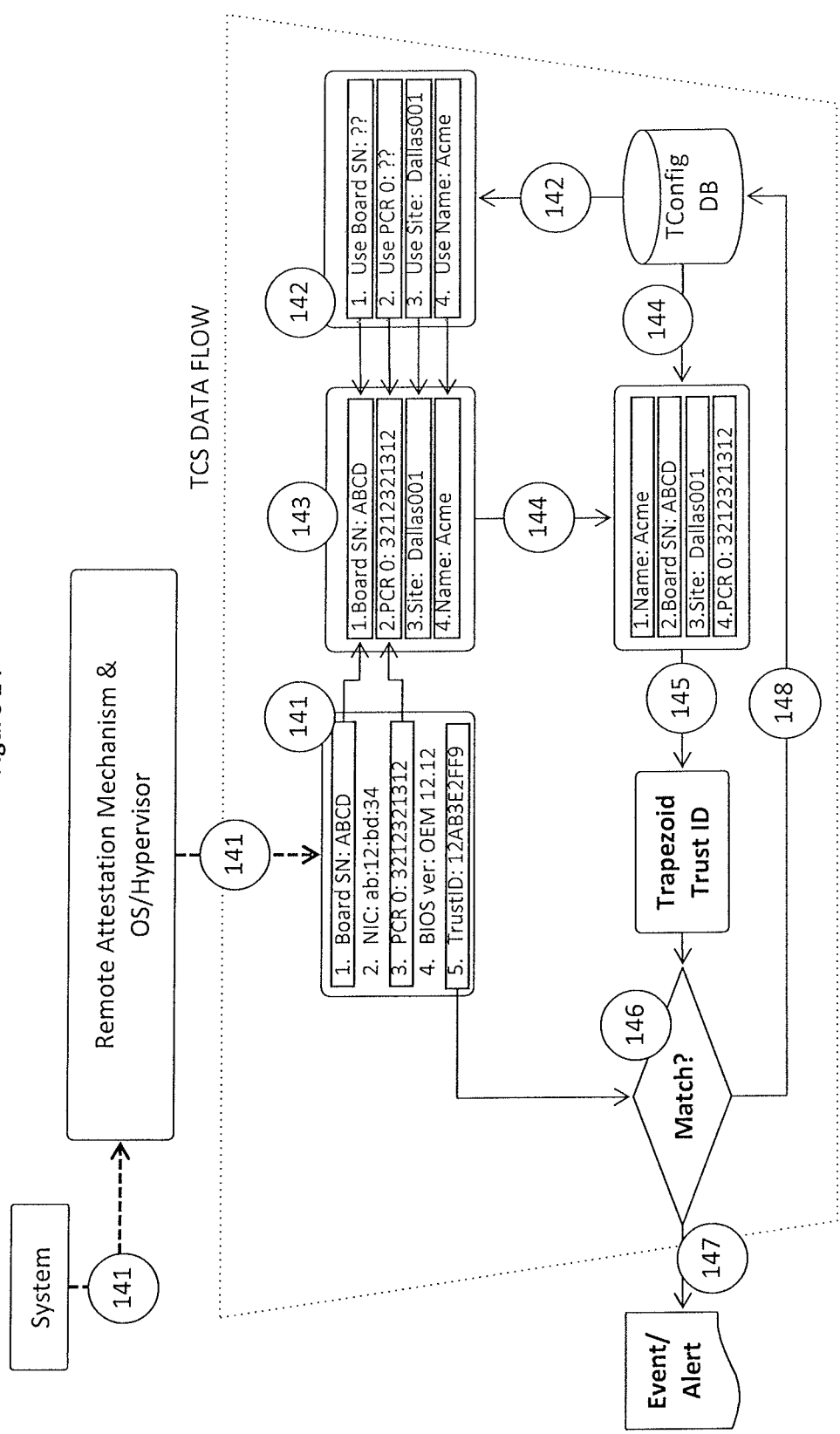
FIG. 14 illustrates a sample of verifying a Trust ID from Seed Values.

FIG. 14 illustrates a sample of verifying a Trust ID from Seed Values. TCS for the platform System via the Remote Attestation Mechanism and OS/Hypervisor obtains in step 141 SCoT and DCoT Measurements, Trust ID, and local Seed Values from the specific device, which are not previously known to the User or TConfig. TConfig obtains in step 142 the pre-existing User configuration of required seed values, which are not previously known to the OS/hypervisor or TConfig. TConfig assembles a list of required seed values in step 143, retrieves in step 144 the encoding sequence from its database (not known to the User or the OS/hypervisor), calculates in step 145 the Trust ID, and compares it in step 146 to the stored Trust ID retrieved from the device. TConfig creates in step 147 an appropriate message with the result, and saves the result in its database in step 148.

If the resulting Trust ID matches the reported Trust ID, then implicitly all of the original device-specific Seed Values from the device and the User-specific Seed Values from the Database must match, and, furthermore, the Trust ID was created using the Sequence stored in the Database. If the resulting Trust ID does not match the reported Trust ID, then at least one Seed Value has changed or an incorrect Trust ID has been provisioned on the subject device, either of which implicitly breach the trust of the subject device.

Figure 15:
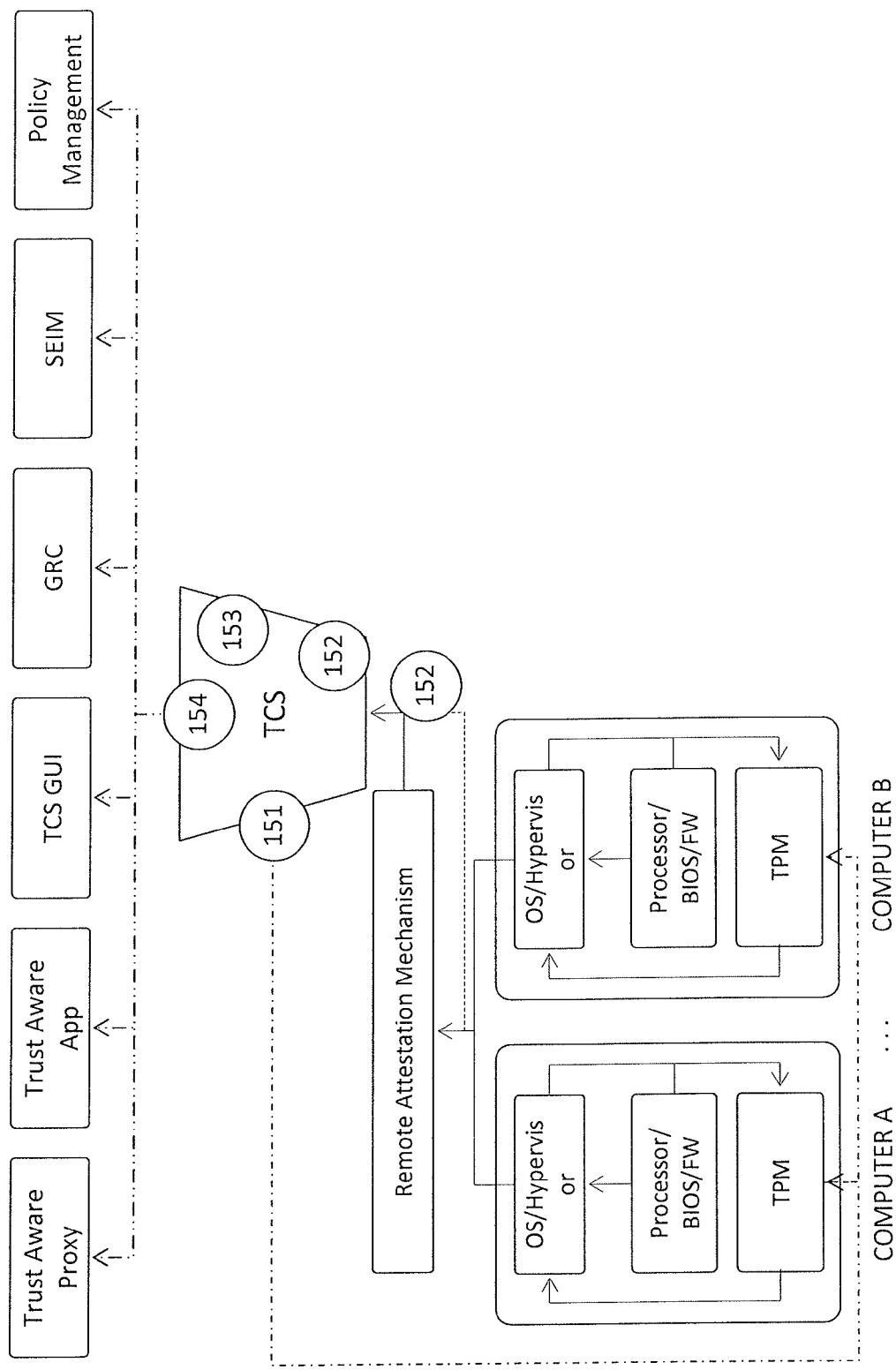
FIG. 15 illustrates a sample of using a Trust ID for hardware-based attestation.

FIG. 15 illustrates a sample of using a Trust ID for hardware-based Attestation. In step 151, the TCS generates and stores the Trust ID value and includes the required whitelist values as Seed Values (see FIG. 12). In step 152, it recalculates and verifies the Trust ID based on User-defined encoding formula. In step 153, it determines if the expected Trust ID matches the reported Trust ID, then that means that the whitelist values must be present on the remote device. In step 154, it orchestrates alerts and/or policy events based on the result. Advantages of embedding the whitelist value in the Trust ID include: if the Trust ID recalculates, then Attestation is automatic; the expected whitelist value is stored BEFORE the OS/hypervisor takes control of the TPM; Attestation occurs independent of any external software-only AS; whitelist changes (updated, corrupted or altered) do not impact attestation of the individual device; in the case of a Trust ID mismatch, the Trust ID provides additional evidence as to the source, nature and timeline of the cause; and it is not limited to servers or TXT implementations.

Figure 16:
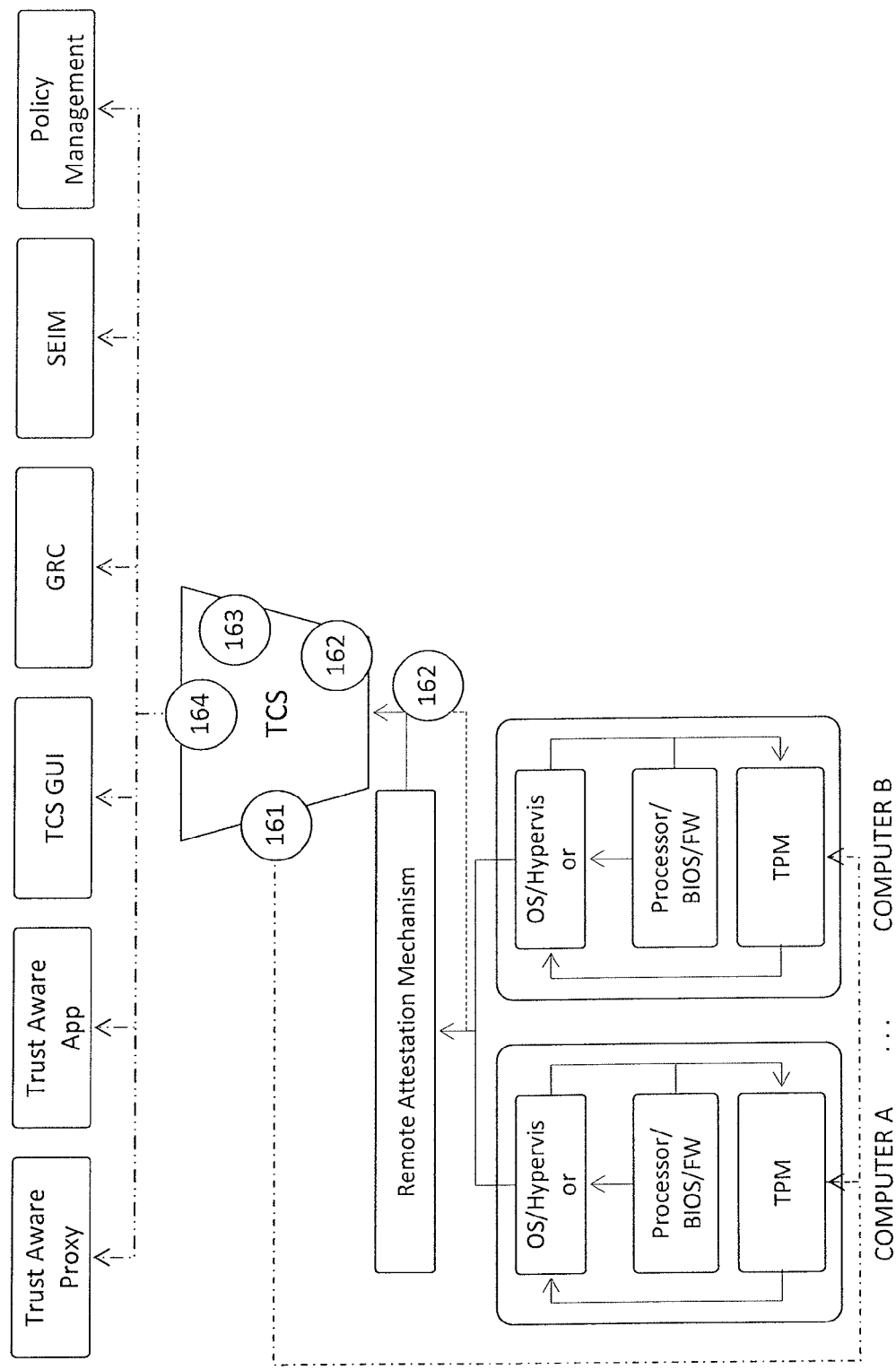
FIG. 16 illustrates a sample of using a Trust ID for geotagging.
Figure 17:
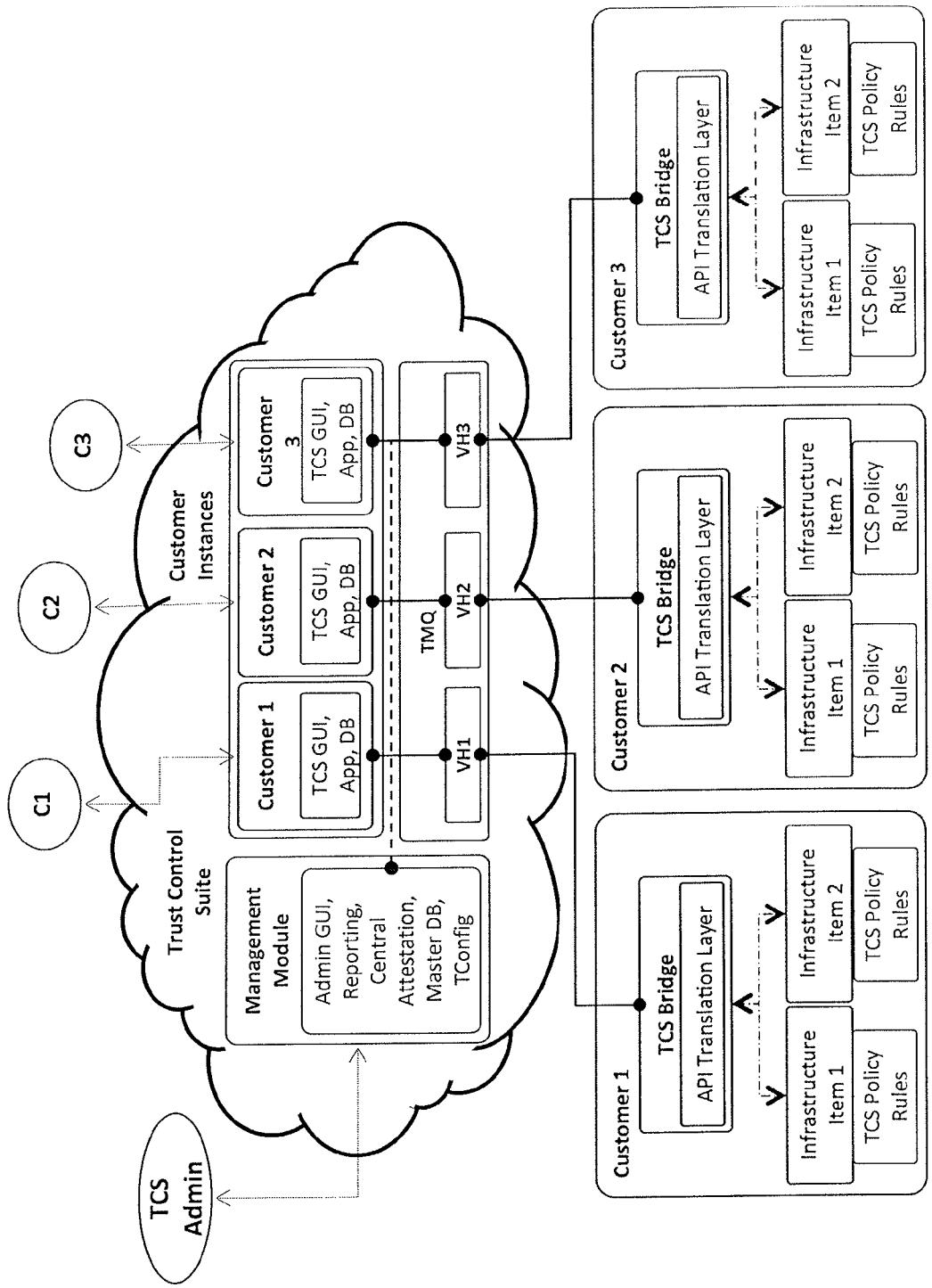
FIG. 17 summarizes the overall architecture of the Trust Control Suite as used for security in virtualized environments.

FIG. 16 illustrates a sample of using a Trust ID with Geotagging. In step 161, the geotag value for the trusted computing pool is used to generate and store the Trust ID. In step 162, TCS recalculates and verifies the Trust ID based on the User-defined chosen formula (see FIG. 13). In step 163, the Trust ID can be decoded to reveal the common geotag value. In step 164, the TCS orchestrates alerts and policy events based on the result. Advantages of having the unique Trust ID include the common geotag value include: the unique, device-specific Trust ID value reduces the chance of spoofing; in converged infrastructure deployments, each individual blade server has an unique Trust ID; it is not limited to servers or TXT implementations; in the case of a Trust ID mismatch, the Trust ID provides additional evidence as to the source, nature and timeline of the cause; it can be combined with other Seed Values; and it is not limited to servers or TXT implementations FIG. 17 summarizes the overall architecture of the Trust Control Suite as used for security in virtualized environments in cloud computing. The Trust Control Suite administered by TCS Admin acts as an intermediary in cloud computing between the computing infrastructure platforms of subscribing Customers 1, 2, 3, etc. and their respective shared-workload applications C1, C2, C3, etc. that are delivered. The Trust Control Suite has a Management Module and Customer Instances that includes a TMQ interface VH1, VH2, VH3, etc. for each Customer platform.

It is understood that many modifications and variations may be devised given the above description of the principles of the invention. It is intended that all such modifications and variations be considered as within the spirit and scope of this invention, as defined in the following claims. For example, a Trust ID can include other Trust IDs as Seed Values, and can serve as multiple Attestation points. Furthermore, the Trust ID can be used in systems to provide additional evidence as to the source, nature and timeline of the cause of a breach of trust.

The invention claimed is:

1. An integrity verification management method for security of communications among a local attestation service computer and a plurality of remote computer information technology (IT) machines to be identified in a trusted computing group on a computer network, comprising:

requesting in an initial configuration procedure performed by the local attestation service computer, in communication with a target remote IT machine to be identified in the trusted computing group, a set of alphanumeric values defined by a user of the target remote IT machine, including hardware-specific seed values that are uniquely and unchangeably associated with specific physical hardware embodied with the target remote IT machine, generating at the local attestation service computer a unique encoded alphanumeric value (original Trust ID value) by combining the set of alphanumeric values defined by the user of the target remote IT machine, including hardware-specific seed values that are uniquely and unchangeably associated with specific physical hardware embodied with the target remote IT machine, using a Trust ID encoding algorithm;

storing the locally generated encoded Trust ID value associated with the specific physical hardware for the target remote IT machine in a secure memory storage of the target remote IT machine;

locally storing in the local attestation service computer the user-defined alphanumeric values associated with the target remote IT machine together with a list of types of hardware-specific seed values associated with the specific physical hardware embodied with the target remote IT machine; and performing, at the local attestation service computer locally and independently from the target remote IT machine, a local attestation procedure via a trust control application program of the attestation service computer for computing a Trust ID value by (1) requesting for retrieval from the target remote IT machine the stored original Trust ID value and the hardware-specific seed values of the stored list of types associated with specific physical hardware embodied with the target remote IT machine, and (2) combining the locally-stored user-defined alphanumeric values with the hardware-specific seed values retrieved from the target remote IT machine and encoding a comparison Trust ID value using the same Trust ID encoding algorithm that was used to encode the original encoded Trust ID value stored in the target remote IT machine;

comparing at the local attestation service computer the comparison Trust ID value encoded in the local attestation procedure with the original encoded Trust ID value retrieved from the target remote IT machine, and upon a match, determining that the target remote IT machine is a trusted IT machine in the trusted computing group, or upon a failure to match, determining that the target remote IT machine is not a trusted IT machine in the trusted computing group, then taking an appropriate security action by the trust control application program of the local attestation service computer, wherein the original encoded Trust ID value is stored in the memory storage associated with the remote IT machine by a provisioning tool provided with each IT machine, and wherein based upon whether there is a match or mismatch of the recalculated comparison Trust ID value with the previously stored original encoded Trust ID value, predetermined chosen alerts and policy events are orchestrated based on the result.

2. The integrity verification management method according to claim 1, further comprising storing the original encoded Trust ID value in a secure storage location physically associated with the hardware of the target remote IT machine.

3. The integrity verification management method according to claim 1, wherein the user-defined alphanumeric values include a geolocation value associated with the physical location where the target remote IT machine is to be deployed in order to define its grouping with the trusted computing group associated with that geolocation.

4. The integrity verification management method according to claim 1, wherein the hardware-specific seed values include values associated with the given version of any firmware, BIOS, ROM, or other embedded code (collectively "firmware") present on target remote IT machine.

5. The integrity verification management method according to claim 1, wherein the creation of the original encoded Trust ID value is carried out without the knowledge of the user of the target remote IT machine as a precaution against security penetration and spoofing.

6. The integrity verification management method according to claim 1, wherein the unique encoded Trust ID value incorporates Seed Values selected from predetermined categories of Trust ID types.

7. The integrity verification management method according to claim 1, wherein the unique encoded Trust ID value is generated to include a geotagging value for the trusted computing group.

8. The integrity verification management method according to claim 1, wherein the local attestation service computer is configured to perform the local attestation procedure as part of a Trust Control Suite.

9. The integrity verification management method according to claim 8, wherein the unique encoded Trust ID value is generated by a TConfig module of the Trust Control Suite.

10. The integrity verification management method according to claim 9, wherein the Trust Control Suite has a modular architecture having instances for respective ones of the plurality of information technology platforms in the trusted computing group.

11. The integrity verification management method according to claim 8, wherein the Trust Control Suite is used for ensuring security for a plurality of information technology platforms in a trusted computing pool.

12. The integrity verification management method according to claim 1, wherein the encoded Trust ID value is generated in a Trust ID validation process.

13. The integrity verification management method according to claim 12, wherein the encoded Trust ID value is generated by selecting one or more of hardware-specific Seed Values, contextual values, user-specific Seed Values, and policy values.

14. The integrity verification management method according to claim 12, wherein the encoded Trust ID value is generated by an encoding algorithm for hash encoding and combining the hardware-specific and other user-defined alphanumeric values in a selected sequence.

15. The integrity verification management method according to claim 1, wherein the hardware-specific and other user-defined alphanumeric values are chosen by the user of the remote IT machine during the initial configuration process for the remote IT machine.

16. The integrity verification management method according to claim 1, wherein the comparison Trust ID value is generated by recalculation to verify a previously stored encoded Trust ID value for each IT machine.

17. The integrity verification management method according to claim 1, wherein the encoded Trust ID value is generated by including a geotag value common to the trusted computing group with the hardware-specific and other user-defined alphanumeric values.

18. The integrity verification management method according to claim 17, wherein the encoded Trust ID value is decoded to reveal the common geotag value.

* * * * *